United States Patent [19]

Kuwabara

[11] Patent Number: 4,525,801
[45] Date of Patent: Jun. 25, 1985

[54] DISK STORAGE CONTROLLER

[75] Inventor: Shigeyuki Kuwabara, Isehara, Japan

[73] Assignee: Hitachi, Ltd., Tokyo, Japan

[21] Appl. No.: 331,819

[22] Filed: Dec. 17, 1981

[30] Foreign Application Priority Data

Dec. 19, 1980 [JP] Japan .............................. 55-178893

[51] Int. Cl.³ .............................................. G06F 3/06
[52] U.S. Cl. .................................................... 364/900
[58] Field of Search ... 364/200 MS File, 900 MS File; 360/86, 97, 98, 99

[56] References Cited

U.S. PATENT DOCUMENTS

| 4,047,157 | 9/1977 | Jenkins | 364/200 |
| 4,144,583 | 3/1979 | Lawson et al. | 364/900 |
| 4,148,098 | 4/1979 | McCreight et al. | 364/200 |
| 4,161,778 | 7/1979 | Getson, Jr. et al. | 364/200 |

Primary Examiner—Thomas M. Heckler
Attorney, Agent, or Firm—Antonelli, Terry & Wands

[57] ABSTRACT

Information recorded on a disk recording medium may have various types of recording status. In order to correctly access the information on the disk recording medium, it is necessary to adapt a device to the recording status of the recording medium. A controller for a disk storage which receives information necessary for the adaption from an upper hierarchy device such as a channel is disclosed.

8 Claims, 2 Drawing Figures

DISK STORAGE CONTROLLER

BACKGROUND OF THE INVENTION

1. Field of the Invention

In a small scale computer system, a disk storage which uses a recording medium called a floppy disk is connected as a file storage. The present invention relates to a controller for controlling an operation of such a disk storage.

2. Description of the Prior Art

In the floppy disk storage, each track of the disk is usually divided into a plurality of areas of equal and phyically fixed length, and data is read and written by the area as a unit. This area is called a sector and a maximum number of bytes stored in the sector is called a sector length.

In the past, a single density recording system in which 128 bytes of data are stored in one sector has been widely used, but in recent years, a double density recording system in which the recording density is doubled and the sector length is increased to 256, 512 or 1024 bytes has been used. Accordingly, it is necessary that the floppy disk storage be compatible with various types of floppy disks.

When data is read from or written into the floppy disk, it is necessary, as a matter of course, to prepare a reference signal which matches the recording density of the floppy disk used. Furthermore, the data cannot be read or written without the knowledge of the sector length of the floppy disk used. Thus, when a floppy disk storage to which various floppy disks of different recording densities and different sector lengths may be loaded is to be accessed, information for specifying the recording density and the sector length (hereinafter referred to as recording status information (RSI) is necessary in addition to address information.

A conventional floppy disk has an index track which was recorded in the single density recording system and includes the RSI of the floppy disk. In the conventional floppy disk storage, the RSI is first read from the index track at the time of first access and it is stored in a memory of a disk controller, and then desired data is accessed. In the subsequent accesses, the RSI of the floppy disk is read from the memory and then desired data is accessed. However, in such a system, since the RSI has to be first read from the index track at the first access, an extra access time is required and the overall access time increases.

SUMMARY OF THE INVENTION

It is an object of the present invention to provide a disk storage controller which can reduce the access time at the first access.

In accordance with the present invention, the disk storage controller receives the RSI from an upper hierarchy device at the first access and accesses desired data based on the received RSI. The RSI received from the upper hierarchy device is stored in a memory of the disk controller, and it is read out at the subsequent accesses.

In accordance with the present invention, the read operation to read the RSI from the index track at the first access is not necessary and hence the access time is reduced accordingly.

DESCRIPTION OF THE PREFERRED EMBODIMENT

Figure 1:
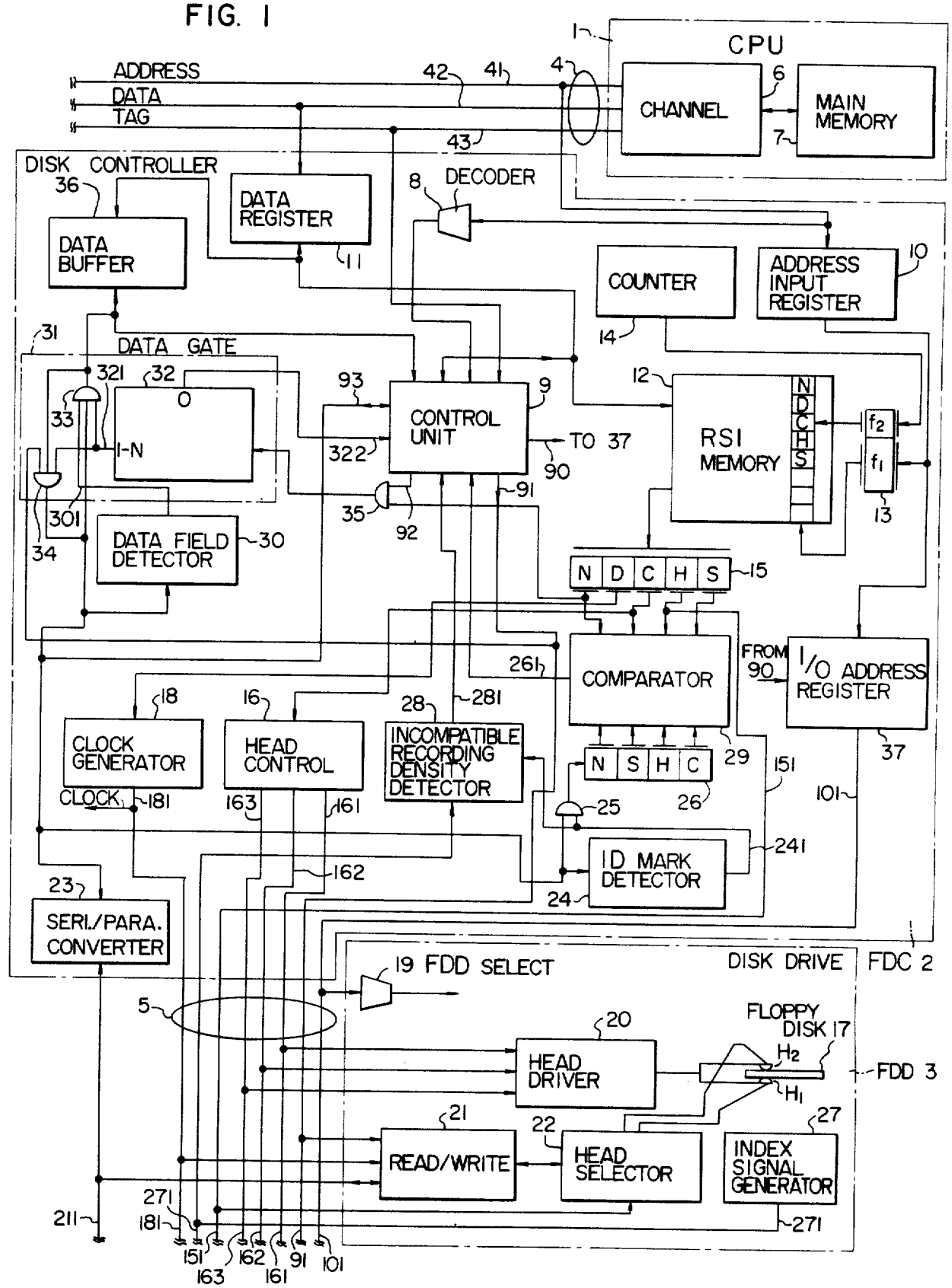
FIG. 1 shows a block diagram of a computer system including a flopy disk storage in accordance with the present invention.

FIG. 1 shows a block diagram of a computer system. Numeral 1 denotes a central processing unit (CPU), numeral 2 denotes a floppy disk controller (FDC) which is connected to the CPU 1 through interface lines 4, and numeral 3 denotes a floppy disk drive (FDD) which is connected to the CPU 1 through interface lines 5. The interface lines 4 are used to connect a certain number of controllers for various types of files and input/output devices (hereinafter aggregately called I/O devices) to the CPU 1. The interface lines 5 are used to connect a certain number of FDD's 3 to the FDC 2. While only one FDD 3 is shown in FIG. 1, a plurality of FDD's 3 are actually connected, and the FDC 2 and the FDD's 3 form the floppy disk storage. The interface lines 4 include an address line 41 for carrying an address signal, a data line 42 for carrying a command and data, and a tag line 43 for indicating types and transfer directions of the signals carried by the address line 41 and the data line 42. The interface lines 4 are connected to a channel 6 in the CPU 1. The channel 6 functions to control the data transfer between the I/O devices and a main memory 7 of the CPU 1, as is well known in the art.

The system of FIG. 1 operates in the following manner. When the CPU 1 first issues a start I/O instruction to start the I/O operation, the channel 6 reads out a channel address word (CAW) and a leading channel command word (CCW) of a channel program from the main memory 7. The channel 6 then supplies an address of the I/O device specified by the start I/O instruction (hereinafter referred to as I/O address) and a command specified by the leading CCW to the address line 41 and the data line 42, respectively. The leading CCW of the channel program includes an RSI transfer command which commands to transfer the RSI of the I/O device to be accessed to the FDC 2. The I/O address identifies the I/O device and comprises a plurality of bits, the high order bit portion of which identifies the controller which controls the I/O devices. The channel 6 supplies an I/O address from the address line 41 to the FDC 2 each time it sends a command to the FDC 2.

In the FDC 2, a decoder 8 monitors the high order bit portion of the I/O address carried by the address line 41. When the high order bit portion specifies that device, the decoder 8 supplies a signal to a control unit 9. The control unit 9 controls the overall operation of the FDC 2. It may execute the control function by microprograms. When the control unit 9 receives the signal from the decoder 8, it acknowledges the start I/O command from the channel 6 and reads the content on the address line 41 into an address input register 10 and reads the content on the data line 42 into a data input register 11. The control unit 9 checks the content of the data input register 11, that is, the RSI transfer command to acknowledge that the RSI will be transferred from the channel 6.

After the channel 6 has transferred the RSI transfer command to the FDC 2, it accesses the main memory 7 by the data address field of the CCW to read out the RSI and supplies the RSI to the data line 42. The RSI comprises one byte of sector length data N and one byte of recording density data D. The channel 6 alternately supplies the data N and D to the data line 42.

Numeral 12 denotes a one-byte length word memory for storing the RSI suplied from the channel 6. Numeral 13 denotes an address register for specifying a word in the memory 12. A high order bit field $f_1$ of the address register 13 receives the content of the address input register 10 and specifies eight words of the memory 12. Accordingly, eight words are allocated to each FDD 3. A lower order bit field $f_2$ of the address register 13 stores the content of a 3-bit counter 14 and specifies one of the eight words. The counter 14 is incremented by one for each access. When the data N and D are supplied from the channel 6 through the data line 42, that data is written in the FDC 2 at the address in the memory 12 specified by the address register 13, through the data input register 11. Then, the control unit 9 sends a one-byte data word called a device end report byte to the channel 6 through the data register 11 and the data line 42 and terminates the execution for the RSI transfer command. The FDC 2 sends the device end report byte to the channel 6 at the completion of the execution of each command.

When the channel 6 has completed the process for the RSI transfer command, the channel 6 reads out the next CCW from the main memory 7 and supplies the command specified by the CCW to the data line 42 in the same manner as that of the process for the RSI transfer command. The CCW in this case is a seek command to command a seek operation for a desired data. The FDC 2 checks the seek command supplied from the CPU 1 and acknowledges that the address information will be transferred from the channel 6. After the channnel 6 has transferred the seek command to the FDC 2, the channel 6 accesses the main memory 7 by the data address field of the CCW to read out the address information and supplies it to the data line 42. The address information comprises a one-byte cylinder address C for specifying a track of the floppy disk, a one-byte head address H for specifying a front side or a back side of the floppy disk and a one-byte sector number S for specifying a sector number. When the cylinder address C, the head address H and the sector number S are sent from the channel 6 through the data line 42, the FDC 2 writes those into the address of the memory 12 specified by the address register 13, through the data input register 11. So far, five of the eight words of the memory 12 associated with the FDD 3 have been written as shown in FIG. 1. The remaining three words are not used in the present invention.

Numeral 37 denotes an I/O address register which reads in the I/O address from the address input register 10 when the control 9 issues a signal 90. The signal 90 is issued when the seek command, read command or write command is executed for the FDD 3. A plurality of FDD's are connected to the interface lines 5, and an I/O address signal 101 from the I/O address register 37 is supplied to a decoder 19 of each of the FDD's 3. When the decoder 19 decodes that the supplied I/O address specifies that device, the decoder 19 issues a signal for activating the elements 20, 21, 22, 27 in the corresponding FDD 3.

The FDC 2 executes the seek command for the FDD 3. The content of the address input register 10 is transferred to the address register 13 while the content of the counter 14 is cleared and the cleared content is transferred to the address register 13 to initiate the read operation of the memory 12. Five bytes of data are read and that data is loaded into a read register 15. A head control circuit 16 of the FDD 3 which controls the movement of magnetic heads H1 and H2 is activated.

The head control circuit 16 responds to the cylinder address C stored in the read register 15 to produce a movement direction signal 161 for indicating the directions of movement of the magnetic heads H1 and H2, a movement distance signal 162 for indicating the distances of movement of the magnetic heads H1 and H2, and a contact signal 163 for instructing to bring the magnetic heads H1 and H2 floating on the surfaces of the floppy disk 17 into contact with the surfaces. Numeral 20 denotes a head drive circuit for moving and contacting the magnetic heads H1 and H2. The circuit 20 responds to the movement direction signal 161, the movement distance signal 162 and the contact signal 163 supplied from the head control circuit 16 to drive the magnetic heads H1 and H2 to position them to a desired track. The magnetic heads H1 and H2 are linked to each other and driven in union.

When the seek command is supplied from the channel 6 to the FDC 2, the magnetic heads H1 and H2 of the FDD 3 specified by the I/O address are positioned to the track specified by the cylinder address C of the read register 15. After the channel 6 has completed the execution for the seek command, it reads out the next CCW from the main memory 7 and supplies a command specified by the CCW to the data line 42 in the same manner as that of the execution for the seek command. The CCW in this case is a read command for reading out a desired data or a write command for writing a data from the main memory 7. The execution for the read command is first explained.

When the FDC 2 receives the read command, it supplies the content of the address input register 10 to the address register 13 and clears the counter 14 and supplies the cleared content to the address register 13 to initiate the read operation of the memory 12. Five bytes of data are read and those data are loaded to the read register 15. Numeral 18 denotes a clock generator which generates a clock signal 181 necessary for the FDC 2 and the FDD 3. The clock generator 18 responds to the recording density data D in the read register 15 to produce a clock signal of an appropriate frequency when the data D indicates single density recording and a clock signal of double frequency when the data D indicates double frequency recording.

Numeral 21 denotes a read/write circuit which demodulates a reproduced signal from the magnetic head H1 or H2 to produce a read signal, and modulates the write data from the FDC 2 to produce a record signal. Read and write modes of the read/write circuit 21 are specified by a control signal 91 from the control 9. The clock signal 181 from the clock generator 18 of the FDC 2 is supplied to the read/write circuit 21.

Numeral 22 denotes a head selecting circuit which selects one of the magnetic heads H1 and H2 in response to a head selection signal 151 from the FDC 2 and connects the selected head to the read/write circuit 21.

A floppy disk 17 is a thin disk having magnetic layers coated on surfaces of a flexible base material. It is loaded into the FDD 3 while it is accommodated in a rectangular envelope. The floppy disk 17 is continuously rotated by a drive mechanism, not shown. When the read command is supplied from the channel 6 to the FDC 2, the control signal 91 specifies the read mode, and the read signal from the track specified by the cylinder address C and the head address H of the read register 15 is outputted from the read/write circuit 21 in the form of serial-by-bit signal. The read signal is applied to a serial-to-parallel converter circuit 23 in the FDC 2 as a data signal 211 and converted to a parallel-by-bit signal for each byte.

Figure 2:
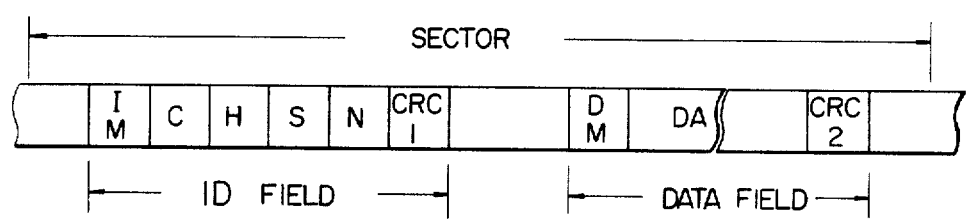
FIG. 2 shows a format of a sector of a floppy disk.

FIG. 2 shows a format of a sector of the floppy disk 17. One sector comprises an identification (ID) field for storing the address information and a data field for storing the data. The areas between the ID field and the data field and between the sectors are non-recorded areas.

The ID field comprises a one-byte unique pattern ID mark IM for indicating the ID field, a one-byte cylinder address C for indicating a cylinder address to which the sector belongs, a one-byte head address H for indicating a surface to which the sector belongs, a one-byte sector number S indicating a sector number of the sector, a one-byte sector length data N indicating a sector length of the floppy disk, and a two-byte error detection and correction code CRC 1 for the ID field. The data field comprises a one-byte unique pattern data mark DM indicating the data field, a transfer data DA to be transferred to and from the channel 6 and a two-byte error detection and correction code CRC 2 for the data field. The number of bytes of the transfer data DA is equal to the number indicated by the sector length data N.

Referring back to FIG. 1, numeral 24 denotes an ID mark detector which monitors an output signal of the serial-to-parallel converter circuit 23, and, if it detects the ID mark IM, produces a signal 241 for the next four-byte period. As the signal 241 is produced, an AND gate 25 is enabled and the content of the ID field is loaded into a compare register 26. The compare register 26 may be a shift register to which the content of the ID field is serially loaded.

Numeral 27 denotes an index signal generating circuit which generates an index signal 271 for each revolution of the floppy disk 17. Numeral 28 denotes an incompatible recording density detecting circuit which counts up the index signal 271 and produces a signal 281 to the control 9 if the signal 241 from the ID mark detecting circuit 24 is not produced before the count reaches three. In the normal case, the clock signal 181 generated by the clock signal generator 18 is compatible with the recording density of the floppy disk 17 loaded to the FDD 3. However, by an error of the channel program or misloading of the floppy disk 17 by an operator, the incompatibility of the recording density may occur.

In such a case, it is not possible to correctly read or write the data by the read/write circuit 21 and hence the ID mark detecting circuit 24 cannot detect the ID mark. The incompatible recording density detecting circuit 28 thus produces the signal 281 after it has detected three revolutions of the floppy disk 17. When the control 9 receives the signal 281, it stops the subsequent operations and sends the device end report byte to the channel 6 through the data register 11 and the data line 42.

Numeral 29 denotes a comparator which compares the cylinder addresses C, the head addresses H, the sector numbers S and the sector length data N of the read register 15 and the compare register 26, respectively, and produces a compare result signal 291 to the control 9. In the comparison by the comparator 29, the sector numbers S are unequal until the ID field of the desired sector is read but other compare items are equal.

However, by some error or other, the cylinder addresses C may be unequal. In this case, the control 9 reactivates the head control circuit 16. However, if the cylinder addresses C are unequal after a certain number of times of reactivation, the control 9 stops the subsequent operations and sends the device end report byte to the channel 6.

The head addresses H or the sector length data N may be unequal by reason of error in the channel program or misloading of the floppy disk 17 by the operator. In this case, the control 9 immediately stops the subsequent operations and sends the device end report byte to the channel 6.

Numeral 30 denotes a data field detecting circuit which monitors the output signal 231 from the serial-to-parallel converter circuit 23 and produces a signal 301 when it detects the data mark DM. Numeral 31 denotes a data gate circuit which controls the passing of the data supplied from the serial-to-parallel converter circuit 23. the data gate circuit 31 comprises a counter 32 and AND gates 33 and 34. The counter 32 counts down the content thereof by one each time when one byte of data is gated out of the data gate ciruit 31. It produces a signal 321 when the content thereof is 1 or more and a signal 322 when the content is 0.

If all of the compare items in the comparator 20 are equal, the control 9 produces a counter set signal 92 to enable an AND gate 35 in order to load the sector length data N in the read register 15 to the counter 32. The data N represents 128, 256, 512 or 1024 and the counter 32 produces the signal 321. All of the compare items in the compare circuit 29 become equal when the ID field of the desired sector is read out. When the data field detecting circuit 30 produces the signal 301, the AND gate 33 is enabled so that the content of the data field is gated through the data gate circuit 31 one byte at a time and supplied to a buffer 36. The control 9 reads out the content of the data buffer 36 one byte at a time and sends it to the channel 6 through the data register 11 and the data line 42.

The transfer data DA in the sector does not always contain significant data bytes equal in number to the number of bytes of the sector length but it may contain a smaller number of data bytes than the sector length. In such a case, dummy data such as all "0's" or all "1's" are written in the remaining area. The counter 32 counts the significant data bytes and the dummy data bytes supplied from the data gate circuit 31. When the data bytes equal in number to the number of bytes of the sector length have been supplied from the data gate circuit 31, the content of the counter 32 reaches zero. At this time, the signal 321 from the counter 32 terminates so that the AND gate 33 is disabled, and the signal 322 is supplied to the control 9. After the control 9 has transferred all of the data written in the data buffer 36 to the channel 6, the controller 9 sends the device end report byte to the channel 6 and terminates the read operation for the floppy disk 17. The channel 6 accesses the main memory 7 by the data address field of the read command CCW and writes therein the read data supplied from the FDC 2 through the data line 42. The channel 6 checks the device end report byte to determine whether the read operation for the floppy disk has been correctly completed or not.

The operation for the seek command followed by the read command has thus been described. The operation for the write command is next explained.

When the FDC 2 receives the write command, it acknowledges that the write data will be transferred from the channel 6. After the channel 6 has transferred the write command to the FDC 2, it accesses the main memory 7 by the data address field of the CCW and reads out the write data therefrom and supplies it to the data line 42. When the FDC 2 receives the write data from the channel 6 through the data line 42, it writes the write data into the data buffer 36. In parallel to the above operation, the FDC 2 reads out the ID field and checks by the comparator 29 if all of the compare items are equal in the same manner as that for the read command. In this case, the control signal 91 to the read-/write circuit 21 specifies the read mode.

When all of the compare items in the comparator 29 are equal, the control unit 9 changes the control signal 91 to specify the write mode and produces the counter set signal 92. Thus, the sector length data N in the read register 15 is loaded into the counter 32, which produces the signal 321. As a result, the AND gate 34 is enabled.

Thereafter, the data mark DM is supplied from the control unit 9 to the signal line 93 and applied to the serial-to-parallel converter circuit 23, and the write data is read out of the data buffer 36 and applied to the serial-to-parallel converter circuit 23 through the data gate circuit 31. The serial-to-parallel converter circuit 23 converts the byte-parallel bits applied thereto to a serial bit signal to produce a data signal 211. The data signal 211 is then applied to the read/write circuit 21 and written onto the floppy disk 17. The counter 32 counts the data bytes supplied from the data gate circuit 31, and when it counts the number of bytes of the sector length, the content of the counter 32 reaches zero. Thus, the signal 321 from the counter 321 terminates to disable the AND gate 34, and the signal 322 is sent to the control unit 9. The channel 6 checks the device end report byte sent from the FDC 2 to determine whether the write operation to the floppy disk has been correctly completed or not.

In the operation described above, the FDD 3 is first accessed by the channel 6. The operation where the same FDD 3 is subsequently accessed is explained below. The channel program knows that the RSI of the FDD 3 to be now accessed has been stored in the memory 12 of the FDC 2. Accordingly, in this case, the RSI transfer command is not inserted in the channel command and the first command transferred from the channel 6 to the FDC 2 is the seek command. The channel 6, the FDC 2 and the FDD 3 thereafter operate in the same manner as that for the first access.

When the CPU 1 accesses a new FDD 3, it is very rear that the floppy disk 17 loaded into that FDD 3 is incompatible with the RSI supplied from the CPU 1. Accordingly, with the arrangement described above, the FDC 2 can, in most cases, immediately access the data based on the RSI supplied from the CPU 1, and hence the access time can be reduced. If the incompatibility with the RSI is detected, the CPU 1 checks the device end report byte from the FDC 2 to determine the error in the access operation. Then, the RSI is read again from the index track and the access is retried based on that RSI.

The process for the CRC codes for the ID field and the data field has been well known in the art and hence it is not explained here. While the recording density and the sector length are used as the RSI in the above explanation, any other recording status information for the recording medium may be additionally used or only a portion of them may be used as the RSI.

While the floppy disk storage has been specifically described, any other type of disk storage may be used.

I claim:

1. A controller for controlling access to information recorded on a disk recording medium in a disk storage from an upper hierarchy device, comprising:

receiving means for receiving recording status information from said upper hierarchy device, said recording status information indicating one of a plurality of different types of recording parameters of said information as recorded on said recording medium;

circuit means responsive to recording status information and commands from said upper hierarchy device as received by said receiving means for controlling said disk storage in accordance with the recording parameter indicated by said recording status information on said recording medium to effect read and write operations on said disk recording medium; and means coupled between said receiving means and said circuit means for controlling the operation of said circuit means so that the read and write operations thereof are compatible with one of said plurality of different types of recording parameters based on said recording status information received by said receiving means.

2. A controller according to claim 1 wherein said recording status information includes information relating to the recording density on said disk recording medium.

3. A controller according to claim 2 wherein said circuit means includes clock generator means for producing a clock signal to control said read and write operations, the frequency of said clock signal being controllable by said controlling means based on said recording status information.

4. A controller according to claim 1 wherein a recording area of said recording medium is divided into a plurality of equal and physically fixed length areas, and said recording status information includes information relating to the length of information written in each of said fixed length areas.

5. A controller according to claim 1 wherein said receiving means includes memory means for storing said recording status information.

6. A controller according to claim 1 wherein said upper hierarchy device is a channel.

7. A controller according to claim 6 wherein said receiving means receives said recording status information from said channel under the control of a channel program of said channel.

8. A disk storage controller for controlling access to information recorded on a disk recording medium to be loaded in the disk storage from an upper hierarchy device, comprising:

(a) receiving means for receiving recording status information indicating a recording parameter of said information recorded on said recording medium, from said upper hierarchy device, said recording status information including at least data indicating recording density and sector length as parameters;

(b) store and setting means coupled to said receiving means for storing the recording status information received by said receiving means and providing setting signals for the controller based on the contents stored therein;

(c) clock generator means responsive to the recording density data from said store and setting means for generating a clock signal adapted for said recording density of said information on the recording medium to clock-control the operation of the disk storage;

(d) data processing length establishing means responsive to said sector length data from said store and setting means for establishing a data processing length corresponding to the sector length for controlling the disk storage; and (e) means for effecting read and write operations of the recording medium based on the outputs of said clock generator means and said data processing length establishing means.

* * * * *